R. C. MEALEY AND A. E. PUFFER.
MILKING MACHINE.
APPLICATION FILED OCT. 26, 1916.
1,361,082.
Patented Dec. 7, 1920.
7 SHEETS—SHEET 2.
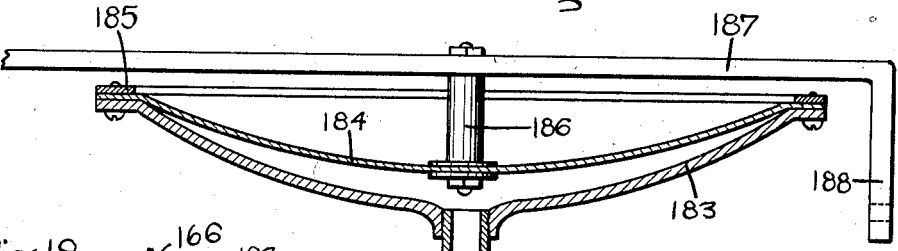
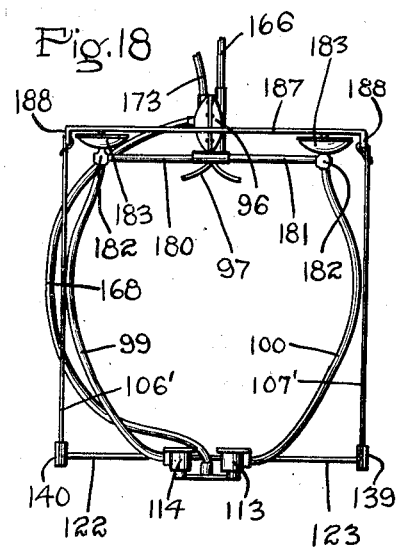
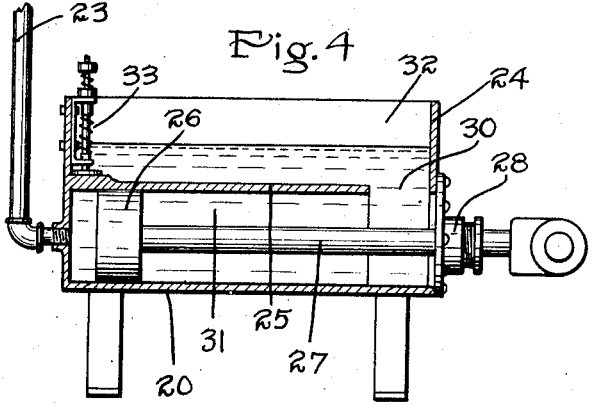
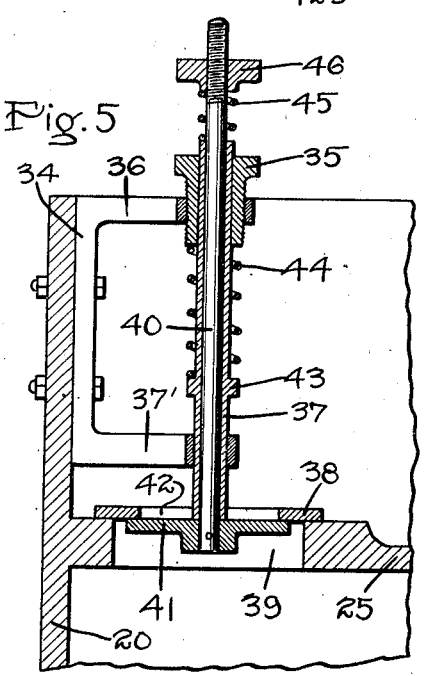
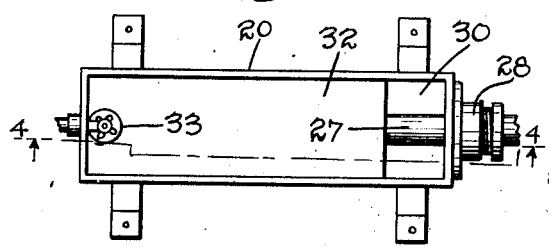
Inventors:
Robert C. Mealey &
Alfred E. Puffer
By F. A. Whitley
their Attorney

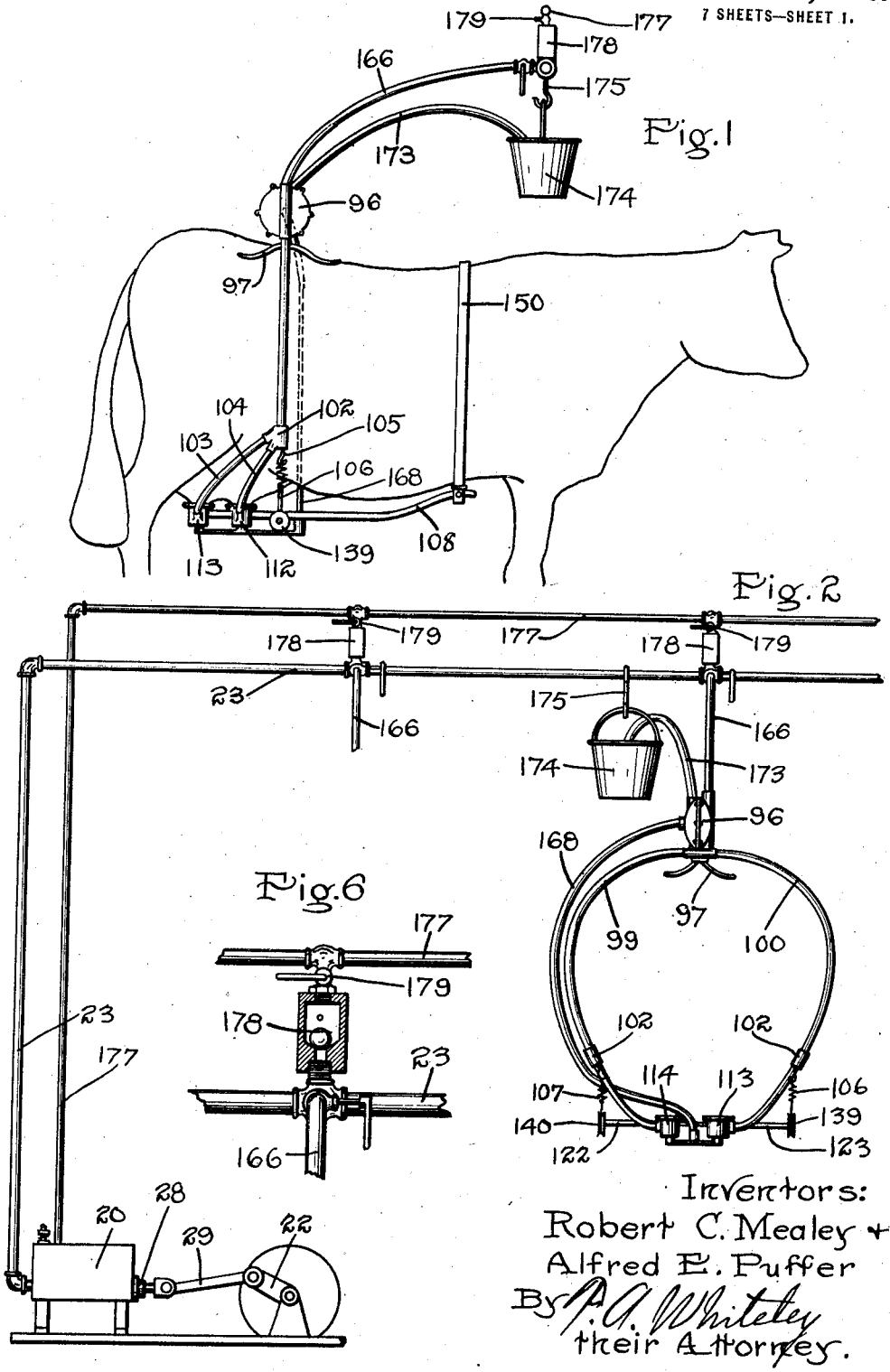

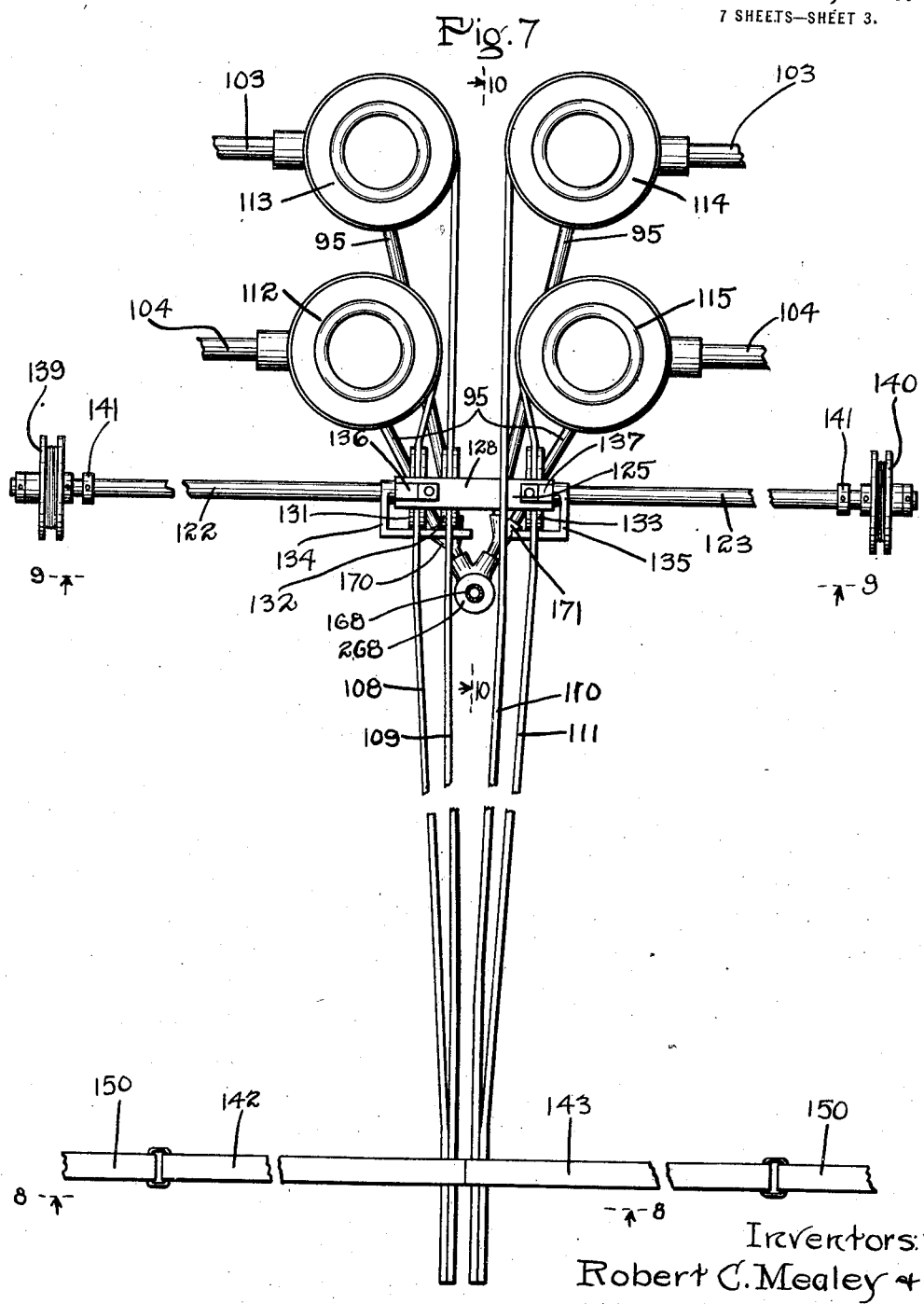

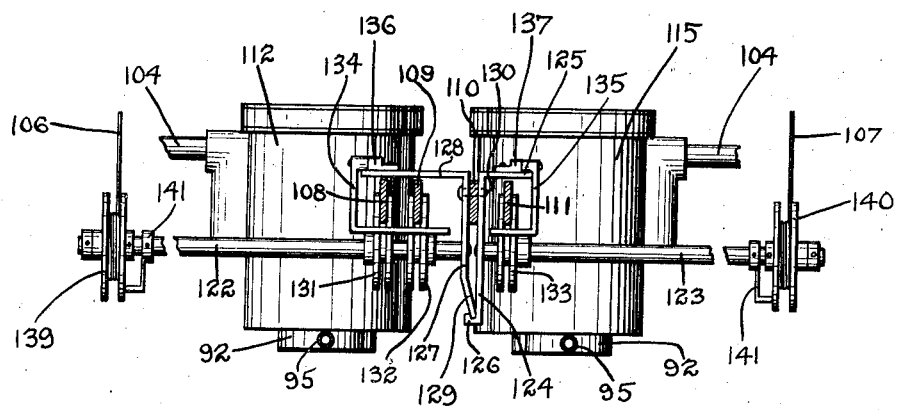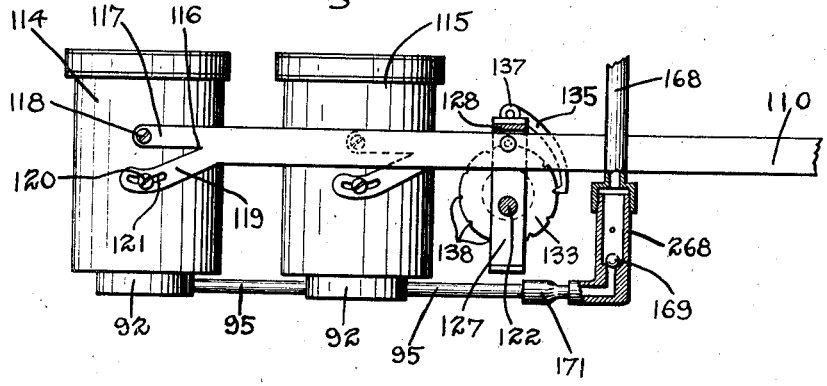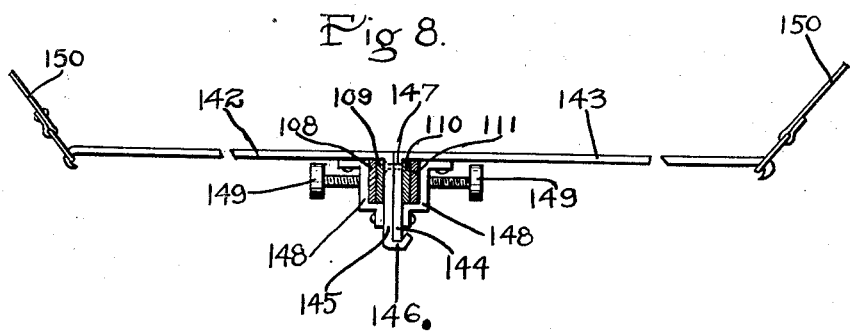

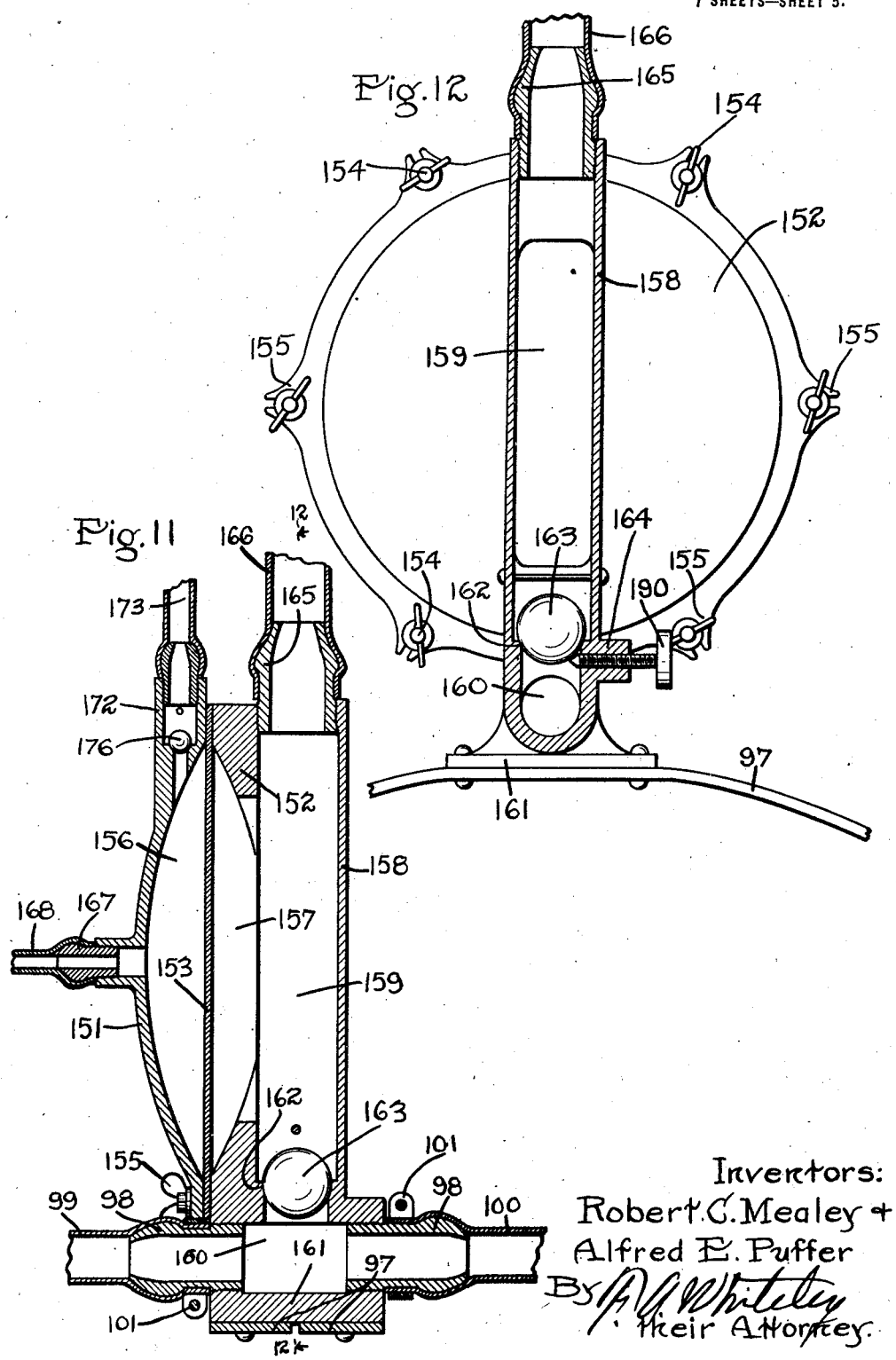

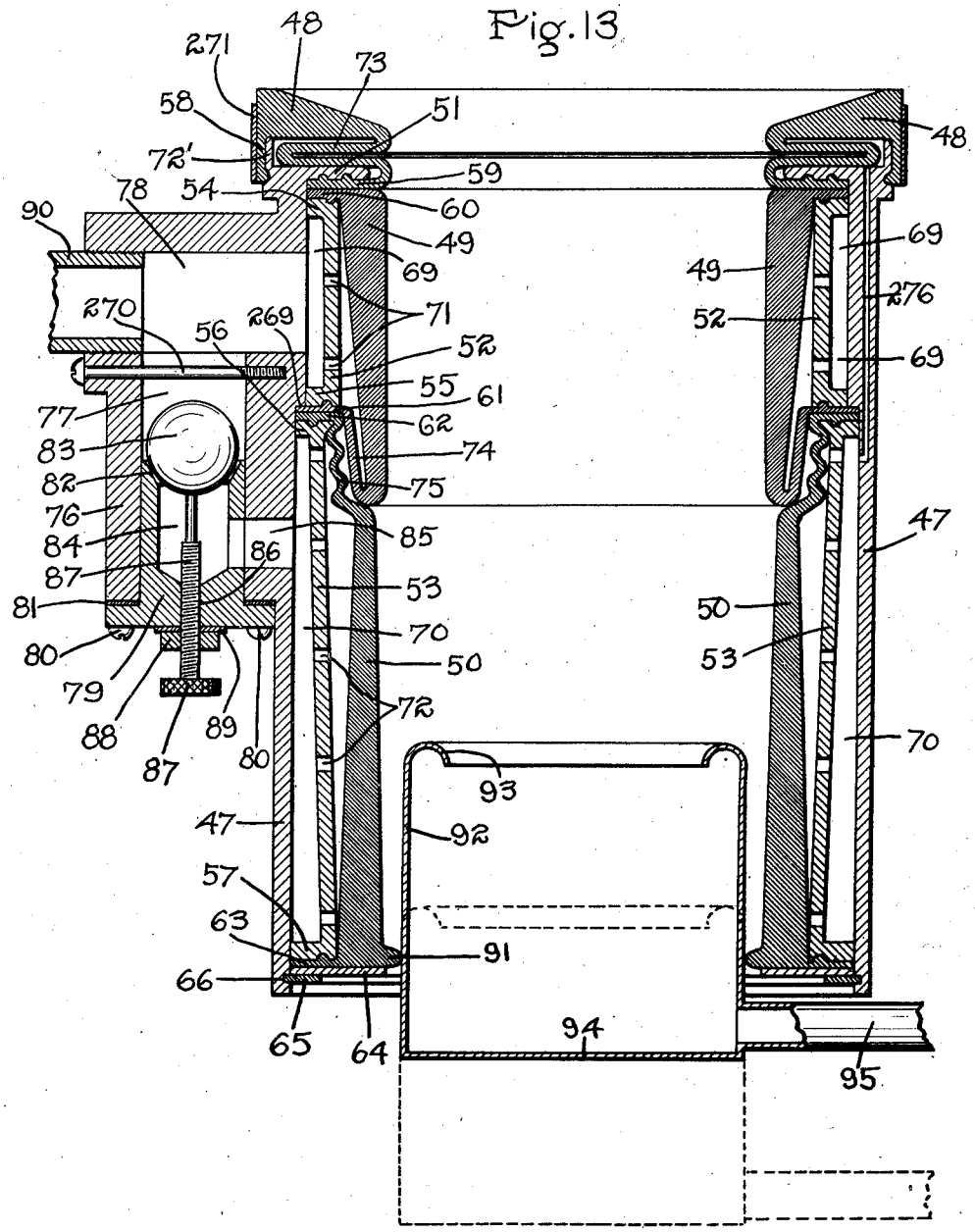

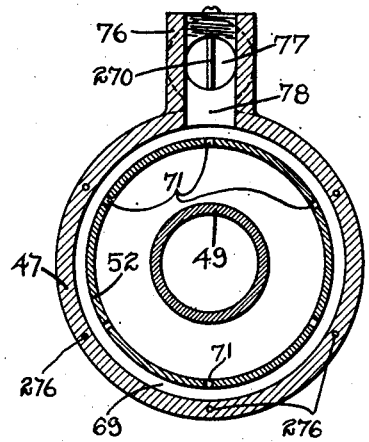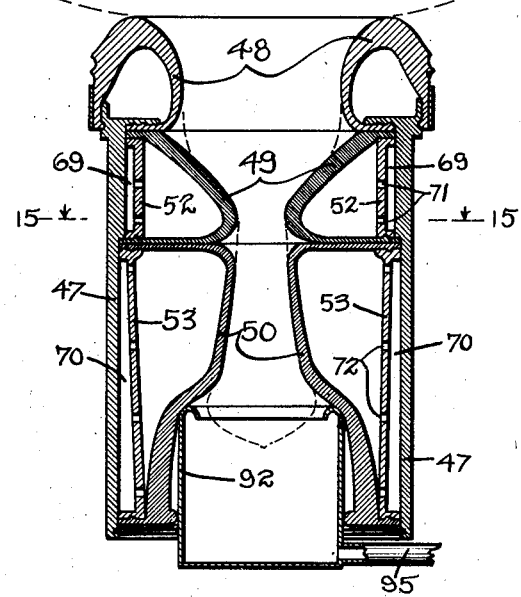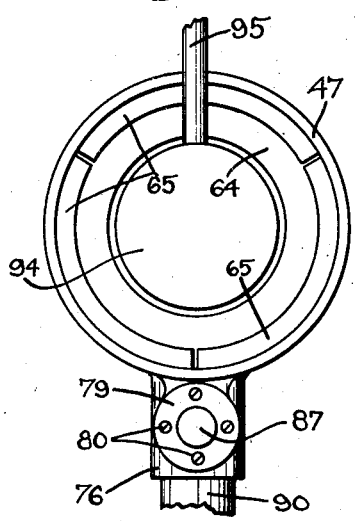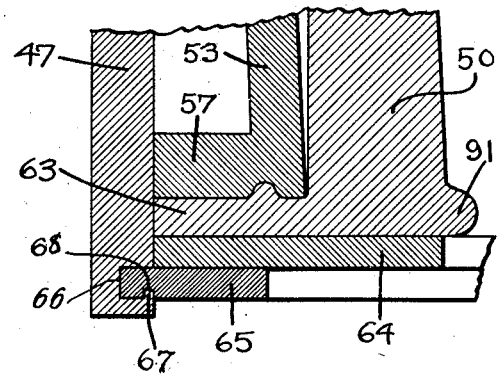

UNITED STATES PATENT OFFICE.

ROBERT C. MEALEY AND ALFRED E. PUFFER, OF MINNEAPOLIS, MINNESOTA.

MILKING-MACHINE.

1,361,082.   Specification of Letters Patent.   Patented Dec. 7, 1920.

Application filed October 26, 1916. Serial No. 127,808.

*To all whom it may concern:*

Be it known that we, ROBERT C. MEALEY and ALFRED E. PUFFER, citizens of the United States, residing at Minneapolis, in the county of Hennepin and State of Minnesota, have invented certain new and useful Improvements in Milking-Machines, of which the following is a specification.

Our invention relates to milking machines and has for its principal object to provide a milking machine in which a liquid is caused to be alternately forced into and withdrawn from a series of inflatable chambers within a teat cup so as to remove the milk in a manner similar to hand milking without employing suction to the teat.

Another object is to employ pumping means operated by the inflating means for removing the milk from the teat cups and discharging it into a suitable reservoir supported above the cow's back.

Another object is to provide the system with a reciprocating pump for causing the inflating liquid to be first forced into the teat cup and then withdrawn, said pump including a double-acting release valve adapted to release the liquid upon either the pressure or suction stroke to automatically regulate the pressure so as to cause the system to operate equally well with any number of milking units.

Another object is to provide a support for the teat cups and tubes leading thereto which support is attached to the cow's back and is severed at the bottom to permit the whole to be thrown over the animal's back from above and then secured together from below. The same is further provided with means to permit each cup to be individually adjusted both vertically and horizontally to adapt the same to fit the cow's teats without interfering with the support or operating tubes connected therewith.

Another object is to provide means for massaging each individual teat of the cow as the same is being milked, as well as to massage the whole udder, thereby acting upon the same in a manner similar to that produced by hand milking when the hand is thrown up against the udder, or to the method employed by a calf with its nose as it withdraws the milk from the cow's teat.

A still further object is to provide a teat cup in which a number of inflatable annular members are provided each having a surplus amount of stock which is normally folded up and which permits the device to act with a considerable force upon the teat without undue pressure in the operating pipe line. A mechanism is included which permits the liquid slowly to inflate some of the inflatable members but which causes them to be quickly collapsed, whereby the milk is drawn slowly from the teat. This cup is further provided with a sleeve insertible from the bottom which sleeve may be adjustably positioned as to height so as to surround the lower portion of the teat and so prevent the opening in the teat from being closed when milk is to be drawn from the same.

The full objects and advantages of our invention will appear in connection with the detailed description thereof and are particularly pointed out in the claims.

In the drawings, illustrating the application of our invention in one form,—

Figure 1 is an elevational view of our apparatus shown applied to a cow. Fig. 2 is a view of the apparatus shown in Fig. 1 as viewed from behind the cow. Fig. 3 is a plan view of the pump shown in Fig. 2 drawn to a larger scale. Fig. 4 is a vertical sectional view of the pump taken on line 4—4 of Fig. 3. Fig. 5 is an enlarged detail view of the double-acting release valve shown in Fig. 4. Fig. 6 is a vertical sectional view of one of the air-escape valves shown in Fig. 2 and drawn to a larger scale. Fig. 7 is a plan view of the teat cup and supporting members shown in Figs. 1 and 2 and drawn to a larger scale. Fig. 8 is a vertical sectional view taken on line 8—8 of Fig. 7. Fig. 9 is a vertical sectional view taken on line 9—9 of Fig. 7. Fig. 10 is a vertical sectional view taken on line 10—10 of Fig. 7. Fig. 11 is a vertical sectional view of the milk pump shown in Fig. 1 taken through the center of the same and drawn to a larger scale. Fig. 12 is a vertical sectional view taken on line 12—12 of Fig. 11. Fig. 13 is an enlarged vertical sectional view of the teat cup taken through the valve mechanism. Fig. 14 is a vertical sectional view similar to Fig. 13 drawn to a smaller scale and showing the expansible members thereof inflated. Fig. 15 is a cross-sectional view taken on line 15—15 of Fig. 14. Fig. 16 is a bottom view of the teat cup shown in Fig. 14. Fig. 17 is an enlarged detail view of some of the parts shown in Figs. 14 and 16. Fig. 18 is a view of a portion of the apparatus shown in Fig. 2 with the udder-massaging mechanism attached thereto. Fig. 19 is a vertical sectional view of some of the elements shown in Fig. 18 drawn to a larger scale.

Our invention in one of its forms is shown in Figs. 1 and 2. A pump 20 is driven by a crank 22 and operates to cause a suitable fluid, which may be water, to alternately be under pressure and suction within a pipe line 23. This pump as shown in detail in Figs. 3, 4 and 5 comprises a casing 24 which is provided with a central horizontal partition 25 and is bored through its lower portion at 31 to receive a piston 26. A piston rod 27 is attached thereto and slides within a gland or stuffing box 28 attached to a wall of casing 24. This piston is connected by a connecting rod 29 to the crank 22 from which the pump 20 is operated. The pipe line 23 is directly connected to the casing 24 to communicate with the cylinder of the pump, so that as the piston reciprocates, the liquid within the cylinder and pipe line is alternately caused to be under pressure and suction. It will be noted that a portion of the partition 25 is cut away, providing an opening 30 communicating with the bore 31 on the rear end of the piston and with the chamber 32 formed in the upper portion of casing 24. At the other end of partition 25 is situated a double-acting release valve 33 connecting chamber 32 with the pipe line 23 and the forward end of the cylinder 31. This valve is shown in detail in Fig. 5. A U-shaped bracket 34 is bolted to the end wall of casing 24 and is provided in its upper arm 36 with a bushing 35 screwable therein. A tubular spindle 37 is mounted for vertical reciprocation in bushing 35 and in the lower arm 37' of the bracket 34. Secured to the lower end of tube 37 is a valve head 38 which covers a port 39 passing through partition 25 and is seated directly on the upper surface of said partition. Within tubular spindle 37 is slidably positioned a rod 40 to the end of which is secured a valve head 41 adapted to freely operate in port 39 and to become seated against the under surface of valve head 38 and to cover a number of ports or passageways 42 extending directly through the same. A collar 43 is formed on tube 37, between which and the bushing 35 is seated a compression coil spring 44 adapted to hold the valve head 38 in firm engagement with its seat on member 25. The tubular spindle 37 extends somewhat above bushing 35, and rod 40 within the same is threaded at its upper end and extends above said tube. A coil spring 45 is seated between the upper end of tube 37 and a nut 46 mounted on the end of rod 40, by means of which the valve head 41 can be held to remain seated against the valve head 38. By adjusting bushing 35 and nut 46 the pressure between the respective valves and their seats can be varied at will. When the full number of milking units is employed in the system both valves 38 and 41 remain closed and the liquid in the system is reciprocated with piston 26. If a smaller number of units is employed a portion of the liquid in the system is discharged through valve 38 and again drawn in through valve 41 for each stroke of said piston, the adjustment of the valves determining the maximum degree of suction and pressure. In this manner the system is adapted to operate between uniform pressure limits and to automatically adapt itself to any number of milking units up to the capacity of the pump.

In conjunction with the system specified we employ a teat cup which is clearly shown in Figs. 13 to 17. An outer tubular casing 47 has positioned within it three inflatable rubber members 48, 49 and 50, which are connected to the pipe line 23 and are adapted to be dilated as the piston in the pump 20 is reciprocated to act upon the cow's teats in a manner similar to hand milking to cause the milk to be withdrawn. These members are secured within the casing 47 as follows. The upper portion of said case is formed with an internal flange 51. Within the case is mounted a pair of sleeves 52 and 53, the latter longer than the former, which sleeves are formed with outwardly-extending flanges 54, 55, 56 and 57 which follow closely the interior of the casing 47 and cause said sleeves to be positioned in spaced relation to said casing. The inflatable rubber members 48, 49 and 50 are formed at their ends with lips 58, 59, 60, 61, 62 and 63, by means of which and the aforementioned sleeves 52 and 53, these members are held in place within the casing 47. In assembling the device the sleeve 52 is positioned between the lips 60 and 61 of member 49 and the sleeve 53 between the lips 62 and 63 of member 50. Member 48 is then slipped in place as shown in Fig. 13 with lip 59 beneath flange 51 and sleeves 52 and 53 slid in place within tube 47 with their respective rubber members attached thereto. The whole may now be forced against flange 51 and held in place by a washer 64 and three segmental keys 65 adapted to be forced into an annular groove 66 formed in the lower edge of tube 47. This locking arrangement is shown in detail in Figs. 16 and 17. Groove 66 is made to provide a fin 67 which is adapted to lie into a corresponding groove 68 provided in each of the keys 65. When all of these keys are in place the same lie in a circle as shown in Fig. 16, and so tend to hold the members 48, 49 and 50 in place to insure tight joints. The inner wall of tube 47 is formed with a shoulder 269 against which lips 61 and 62 are caused to abut. In this manner the space between sleeves 52, 53 and the casing 47 is divided into two chambers 69 and 70 which are sealed from each other and from the exterior excepting through passages, the purpose of which will be presently explained. The sleeves 52 and 53 are provided with perforations 71 and 72 which connect the chambers 69 and 70 with the spaces between the sleeves 52 and 53 and the corresponding rubber members 49 and 50. Member 48 is secured at one end only by flange 51, the other end of said member being secured to the exterior of case 47 by means of a band 271 which is forced over lip 58, causing it to be tightly pressed against an extended portion 72' of casing 47. A number of longitudinal passageways 276, shown in Figs. 13 and 15, communicate with the space within member 48 and the chamber 70. It will be noted that the member 48 is formed with a double fold or lap of stock at 73 and that member 49 is provided with a similar fold of stock at 74 and that the member 50 is also provided with excess stock at 75. It will further be noted that each of these members is composed of material of tapering thickness which causes the expansible members to take the positions shown in Fig. 14 when distended and when acting upon a teat of a cow.

In operation the inflatable members of the teat cup are dilated as follows. Member 49 is arranged with the thinnest portion thereof and the fold 74 at its lowermost extremity and this member is first inflated. The charge of liquid in the system is permitted to enter chamber 69 and the member 49 is quickly distended to grip the teat and close off the milk passage therein. The liquid is then permitted to enter chamber 70 more slowly through an obstructed passage and so to gradually distend member 50 and cause the milk to be drawn from the teat. At the same time member 48 is caused to be inflated, said member rising upward and serving to massage the cow's udder in the vicinity of the teat. Both of the members 49 and 50 are formed with their excess stock positioned near the center of the device with fold 74 of member 49 overlapping fold 75 of member 50. In this manner member 49 is caused to grip the teat at its lowermost edge, the member 50 following closely after and so preventing the milk from being forced backward in the teat.

The mechanism for causing the timed and relative dilation of the various distendable members is best shown in Fig. 13. Casing 47 is formed with a protruding portion 76 which is longitudinally drilled at 77 and has a transverse hole 78 passing directly through the upper part of said protrusion and also through the wall of member 47, said hole communicating at the top with the longitudinal bore 77 and with chamber 69. A flanged sleeve 79 is adapted to be inserted into bore 77 and is secured to the under side of portion 76 by means of set-screws 80. A washer 81 insertible between the flange of sleeve 79 and portion 76 serves to make a water-tight joint. The upper portion of this sleeve is tapered at 82 to form a valve seat for a ball 83 which is movable in bore 77. A pin 270 prevents ball 83 from being thrown out of bore 77. The interior of sleeve 79 is made hollow at 84, which space is connected with chamber 70 by a port 85 extending through sleeve 79 and the wall of tube 47. The lower portion of sleeve 79 is tapped at 86 to receive a thumb screw 87 which extends within cavity 84 to engage ball 83 to lift it off its seat. A lock nut 88 and a washer 89 serve to hold screw 87 in place and to form a tight joint. A tube coupling 90 secured within hole 78 serves to connect the teat cup with the service line 23. When piston 26 is traveling to exert pressure in the pipe line 23 the liquid in the system is forced into hole 78, from which it has a free passage to chamber 69 and from there through perforations 71 into the space between member 52 and member 49. This causes the member 49 to be quickly distended. At the same time the liquid slowly leaks through the opening formed between surface 82 of the valve member 79 and the ball 83 when said ball is unseated and hence slowly flows through port 85 into chamber 70 and through perforations 72 into the space between members 53 and 50 to cause the latter to become slowly distended. Simultaneously the liquid issues from chamber 70 through ports 276 into the space between member 48 and the case 47, thereby also distending said member. In this manner the milk is gradually drawn from the teat, member 50 first closing in on the top in close proximity to member 49, due to the relative thickness of the stock, and then gripping lower and lower until the pressure in the system reaches a maximum, as shown in Fig. 14. When the piston 26 is reversed to form a vacuum in the system, ball 83 is entirely raised off from its seat and all three inflatable members are simultaneously collapsed and returned to their original positions as shown in Fig. 13.

To protect the end of the teat and to prevent the opening therein from being closed by member 50 and thereby cause the milk to be forced backward, we employ a device shown in detail in Fig. 13. At the lowermost edge of member 50 is provided a bead 91 which extends completely around said member on the interior thereof. A tubular cup 92 of uniform diameter is adapted to be inserted into the open end of the teat cup proper and to fit closely within the bead 91. This cup has an overturned upper edge 93 and may be adjustably positioned relative to the bead 91 as indicated in dotted and full lines in Fig. 13. When the teat cup is placed in position member 92 is so adjusted as to just extend above and inclose the lowermost portion of the teat, as clearly shown in Fig. 14. In this position the lower portion of member 50 is rendered inoperative and does not engage the end of the teat, thus leaving the opening in the same free at all times. Member 92 is provided with a bottom 94 and serves as a receptacle into which the milk is discharged from the teat. A tube connection 95 is attached to receptacle 92 by means of which the milk is removed from said receptacle.

The teat cups are adjustably supported from the cow's back by a device best shown in Figs. 1, 2, 7, 8, 9 and 10. A pump 96, which will later be described in detail, is attached to a crow-foot support 97 positioned on the rear of the cow's back and serves to pump up the milk from the teat-cup receptacles 92 as the milk is discharged into the same. This pump is operated from the pipe line 23 and has attached to its lower portion two nipples 98 extending out in opposite directions in right angles to the cow's back and having secured thereto a pair of tubes 99 and 100 by means of clips 101. These tubes are adapted to lie along the cow's flanks and extend down along the same for some distance and terminate in hose couplings 102. Each of these couplings is rigidly secured to the corresponding tubes 99 and 100 and is adapted to have secured to it a pair of tubes 103 and 104 which connect directly to the nipples 90 in the teat cups. Couplings 102 are further provided with hooks 105 to which are attached spring cords 106 and 107, which serve to support the cups in a manner now about to be described.

In our system we employ four teat cups 112, 113, 114 and 115 which have attached to them a number of bars 108, 109, 110 and 111. Each of these bars is secured to the cup through a forked end 116, the upper prong 117 of which is pivotally secured to the cup proper by a screw 118 and the lower prong 119 of which is similarly secured to the cup by a screw 120 which passes through a slotted hole 121 in said prong. By this means the various cups can be adjustably tilted relative to the respective supporting bars 108, 109, 110 and 111. From cords 106 and 107 are hung two shafts or rods 122 and 123 which are detachably held in axial alinement at one end and which support the bars 108, 109, 110 and 111 near the centers thereof. To the inner end of shaft 123 is secured a bar 124 which has a portion 125 bent out at right angles and extending backward parallel to said shaft, and which bar is bent at its lower end to provide a hook 126, as clearly indicated in Fig. 9. Shaft 122 has secured to its inner end a bar 127 similar to bar 124, which also has an angular portion 128 at the top but which is provided with an internal end 129 adapted to rest in the socket provided by the hook portion 126 of member 124. The supporting bar 110 is securely riveted or screwed to the bar 124. A studded pin 130 is secured to bar 127 and passes through a corresponding hole in bars 110 and 124. By this device shafts 122 and 123 can be detachably held together at the center and can readily be separated by lifting the same upward at the point of attachment, which disengages pin 130 from members 110 and 124 and permits the portion 129 to be removed from hook 126. The other supporting bars 108, 109 and 111 rest upon a number of eccentrically-mounted spools or sheaves 131, 132 and 133 which are journaled upon shafts 122 and 123, and which may be both slid and rotated thereon. By oscillating or longitudinally shifting said sheaves the various teat cups can be adjusted to be correctly positioned relative to the teats. To prevent these spools from slipping after once being set, a pair of pawls 134 and 135 are pivoted to lugs 136 and 137 secured to the portions 128 and 125 of the supporting mechanism and engage a series of notches 138 formed in the periphery of the sheaves 131, 132 and 133. The pawls 134 and 135 are made long enough so that they engage the sheaves in any of their adjusted positions. At the outward ends of shafts 122 and 123 are rotatably mounted sheaves 139 and 140 which may be locked in any position by means of spring members 141 secured to said shafts which engage the surface of said sheaves and obstruct the free movement thereof, either by frictional contact or by directly engaging a number of notches in the sides of said sheaves. Cords 106 and 107 are secured to these sheaves and are adapted to be wound up by them, thus permitting the whole device to be bodily raised in position beneath the cow's udder.

The forward ends of the supporting bars 108, 109, 110 and 111 are supported by a device shown in detail in Fig. 8. A pair of bars 142 and 143 are bent downward at right angles at 144 and 145, the portion 145 being hooked or turned up at 146 to receive the end portion 144. A pin 147 is secured to portion 145 and engages a corresponding cavity in portion 144, thereby forming a readily-demountable joint structure identical with that shown in connection with bars 127 and 124. A keeper 148 is secured to each of the bars 142 and 143 and has mounted therein a thumb screw 149. Bars 108 and 109 are adapted to be inserted between keeper 148 and bar 142, and bars 110 and 111 between keeper 148 and bar 143, the respective thumb screws 149 serving to hold them in place when the same are properly adjusted. A strap or circingle 150 is adapted to be passed over the cow's back and secured to the ends of bars 142 and 143. It now becomes evident that the whole supporting device is severed in the center and may be thrown over a cow's back with a half of the device on each side and the parts connected from beneath when the whole weight of the apparatus is upon the animal's back.

The pumping system for removing the milk from the teat cups is best shown in Figs. 1, 2, 11 and 12. Pump 96, already referred to, for this purpose comprises two circular concave casing members 151 and 152 between which is clamped a flexible diaphragm 153 by means of wing nuts and bolts 154 which pass through slotted lugs or projections 155 in said case members. This diaphragm separates the pump into two compartments 156 and 157. Upon the exterior of case member 152 is formed a vertical tubular protrusion 158 which is provided with a longitudinal bore 159 which communicates throughout the greater part of its length with the chamber 157. The lower portion of the bore 159 communicates with a transverse bore 160 in the base portion 161 of member 152 to which the crow foot 97 is attached. In this bore are secured the nipples 98 previously mentioned from which tubes 99 and 100 are hung. The lower portion of bore 159 immediately above its junction with bore 160 is constricted to form a valve seat 162 upon which a ball 163 normally rests. A thumb screw 190 screwed into a boss 164 formed on the side of the tubular protrusion 158 is adapted to unseat ball 163 and so provide a leakage passageway similar to the one used in conjunction with the teat cup. To the upper portion of tube 168 is secured a nipple 165 by means of which a hose 166 may be attached thereto, which hose is connected to the operating pipe line 23 previously referred to. The casing member 151 is provided at its center with a tube connection 167 to which a tube 168 is attached. This tube extends down the cow's back to a position between the teat-cup supporting bars 109 and 110 as shown in Fig. 10, where it is attached to a casting 268 provided with a check valve 169. The lower portion of this casting is forked to receive two hose couplings 170 and 171 which in themselves are divided to form connections for each pair of tubes 95 connected to the receptacles 92 of each set of teat cups. In applying the device it is hence only necessary to make one connection by simply inserting member 170 into the socket in casting 268 provided for this purpose. The upper portion of case member 156 is formed with an outlet 172 to which a hose 173 is attached leading to a milk pail 174 supported from a hook 175 hung from any convenient structure above the cow's back. A check valve 176 is positioned in outlet 172. The operation of the device is self-evident. The pulsations of the water in the system operates diaphragm 153, which acts as a pump and draws the milk from the receptacles 92 and discharges it into pail 174, the check valves 169 and 176 serving to prevent the milk from traveling backward. By adjusting screw 190 the pressure of the liquid in the teat cup can be regulated as desired, said valve raising upward from its seat during the suction stroke of the pump.

Associated with the pipe line 23 may be installed an auxiliary pipe line 177 for removing the air from the system. At each of the milking stations is inserted a check valve 178 which communicates through a throttle valve 179 with pipe 177. Valve 179, when it is desired to drain out the air from the system is partially opened, presenting an obstructed passageway to pipe 177. At the compression stroke of pump 20 valve 178 is lifted and the air forced out into pipe 177. Upon the return stroke valve 178 is reseated and the return of air obstructed. When all of the air is removed water commences to flow into pipe 177 and back to pump 20. This flow however is very slight, due to the fact that the water passes through the obstructed passageway in valve 179 much more slowly than does air.

In addition to the inflatable rubber member 48 for massaging the individual teats of the cow, the device shown in Figs. 18 and 19 may be employed. From the base 161 of pump 96 extend two pipes 180 and 181 which communicate with passageway 160 within said pump. To the end of each of these pipes is secured a T 182 to the lower branches of which are attached the respective tubes 99 and 100. To the upper end of each of said T's is secured a dish-shaped case 183 to which is bolted a flexible diaphragm 184 by means of an annular ring 185. On the center of this diaphragm is mounted a stud 186 which extends up above the level of ring 185 when diaphragm 184 is in its lowermost position. A bar 187 is secured to both of the studs 186 and extends completely across the device and has its extreme ends turned down at 188, as best shown in Fig. 18. In this case cords 106' and 107', which support the teat cups, are directly connected to arms 188 of crossbar 187. As the liquid in the system pulsates diaphragms 184 are caused to be raised and lowered, thus lifting up the teat cups bodily and so working upon the cow's udder to massage the same and cause the cow to let down the milk.

The advantages of our invention are manifest. The whole system is automatic and will not injure the cow if left on after the teat is dry. Absolute stripping of the teat is effected so that the operator has nothing to do but apply the milking units and remove them from the cows. The device requires but a small amount of power and the parts are so designed as to be most simple in construction and most efficient in operation.

We claim:

1. A milking system comprising a pipe line having a liquid therein, a pump connected to one end of said pipe line and adapted to cause the liquid to be reciprocated within the system, a number of pipe connections in the pipe line to which a number of milking units may be independently connected or disconnected, said units being operated by the reciprocation of the liquid within the system, and means for adapting the pump to discharge and return a volume of water proportional to the number of milking units in operation.

2. A milking system comprising a pipe line having a liquid therein, a pump connected to one end of said pipe line and adapted to cause the liquid to be reciprocated within the system, a number of pipe connections in the pipe line to which a number of milking units may be independently connected or disconnected, said units being operated by the reciprocation of the liquid within the system, said pump having a displacement volume sufficient to operate the maximum number of milking units, and means for permitting a portion of the liquid to escape and reënter from and into the pump during a period of the compression and suction strokes when less than the maximum number of units are employed to adapt the pump to discharge and return a volume of water sufficient to operate the units connected to the system.

3. A milking system comprising a pipe line having a liquid therein, a pump connected to one end of said pipe line and adapted to cause the liquid to be reciprocated within the system, a number of pipe connections in the pipe line to which a number of milking units may be independently connected or disconnected, said units being operated by the reciprocation of the liquid within the system, said pump having a displacement volume sufficient to operate the maximum number of milking units, and a double-acting release valve adapted to release under a vacuum or under pressure.

4. A milking system comprising a pipe line having a liquid therein, means for causing said liquid to be reciprocated within the system, a teat cup operated by the motion of the liquid to withdraw milk from the teat during travel of the liquid in one direction and to disengage the teat to permit milk to reënter it during the travel of the liquid in the opposite direction, and a pump operated simultaneously with the teat cup by the motion of the liquid to cause the milk to be withdrawn from the teat cup while the latter is disengaged from the teat and to cause said milk to be discharged when milk is being withdrawn from the teat.

5. A milking machine comprising a support positioned on the cow's back, means secured to said support for withdrawing milk from the cow's teats, and means attached to said support for causing a portion of the milk withdrawing means to periodically engage the cow's udder to massage the same as the teats are milked to cause a more rapid formation of milk within the udder.

6. A milking machine comprising a forward support positioned about the cow's body, a plurality of rearwardly-extending arms supported at one end in said support, a plurality of teat cups attached to said arms, a rearward support positioned on the cow's back, and means attached to said rearward support for adjustably holding said teat cups in position relative to the cow's teats.

7. A milking machine comprising a forward support positioned about the cow's body, a plurality of rearwardly-extending arms attached at one end to said support and adapted to be slid relative thereto, teat cups secured to the other ends of said supports, a rear support, and means attached thereto for adjustably holding said teat cups in position relative to the cow's teats.

8. A milking machine comprising a forward support positioned about the cow's body, a plurality of rearwardly-extending arms supported at one end in said support, teat cups secured to said arms at the other ends, a rearward support mounted on the cow's back, a transverse member secured to said rearward support, a plurality of rotatable members slidably mounted on said transverse member and adapted to engage said rearwardly-extending arms for adjusting the teat cups relative to the teats and for holding them in adjusted position.

9. A milking machine comprising a support having portions detached at their bottom ends and adapted to be thrown over the cow's back with a portion on each side, a plurality of milking devices attached to each end of said support, means for securing the ends of said support together to hold the teat cups in place, and means for connecting the teat cups together to cause them to deliver milk to a single receiver.

10. A milking machine comprising a member adapted to be positioned upon the cow's back and having an operative fluid connection, a tube secured to each side of said member and extending downward along the cow's sides, a support attached to and supported by said tubes, a plurality of teat cups held in milking position by said support, and means for connecting said teat cups with said tubes for causing the same to be operated.

11. A milking machine comprising a member adapted to be positioned upon the cow's back and having an operative fluid connection, a tube secured to each side of said member and extending downward along the cow's sides, a support attached to and supported by said tubes, a plurality of teat cups held in milking position by said support, means for connecting said teat cups with said tubes for causing the same to be operated, and a pump secured to said member for removing the milk from said teat cups and delivering it above the cow's back.

12. A teat cup comprising an outer casing having a passageway therein, means for causing a fluid to be reciprocated within the passageway, an inflatable member within the casing communicating with said passageway and adapted to be directly inflated and contracted by the reciprocating fluid, a check valve within the casing, means for unseating said check valve, and a second inflatable member within the casing communicating with said passageway through the partially-closed check valve and adapted to become slowly inflated through said valve by the flow of the liquid and to become quickly contracted when the direction of travel of the liquid is reversed by the opening of said check valve.

13. A teat cup comprising an outer casing, an inflatable member within the casing adapted to become quickly distended inward to cut off the milk passageway in the teat, a second inflatable member within the casing below said first-named member adapted to become slowly distended inward to withdraw the milk from the teat, and a third inflatable member positioned above the first-named member and adapted to become slowly distended upward in conjunction with said second member to massage the cow's udder to cause a rapid formation of milk within the same.

14. A teat cup comprising an outer casing, an inflatable member within the casing having a portion of surplus stock gathered in at the top thereof, a second inflatable member positioned above the first and having a portion of surplus stock folded over at the bottom and overlapping the gathered portion of said first-named member, both of said members being formed of gradually-varying thickness, being the thinnest at the surplus stock, and means for quickly inflating said second member and for slowly inflating said first member to cause it to follow behind said second member and close in upon the teat in close proximity thereto.

In testimony whereof we affix our signatures in presence of two witnesses.

ROBERT C. MEALEY.
ALFRED E. PUFFER.

Witsesses:
F. A. WHITELEY,
H. A. BOWMAN.